United States Patent [19]

Rajsigl et al.

[11] Patent Number: 4,875,334

[45] Date of Patent: Oct. 24, 1989

[54] SPINDLE CONSTRUCTION FOR MOUNTING ARRANGEMENTS FOR SPINNING MACHINE ROTORS

[75] Inventors: Zdenek Rajsigl; Frantisek Kriź, both of Brno, Czechoslovakia

[73] Assignee: Závody na výrobu ložísk, Povážská Bystrica, Brno, Czechoslovakia

[21] Appl. No.: 272,277

[22] Filed: Nov. 17, 1988

[30] Foreign Application Priority Data

Nov. 19, 1987 [CS] Czechoslovakia .............. PV8316-87

[51] Int. Cl.4 ...................... D01H 7/882; D01H 7/10; F16C 19/08; F16C 33/80
[52] U.S. Cl. ......................................... 57/406; 57/92; 57/100; 384/144; 384/227; 384/603
[58] Field of Search ................... 57/404, 406, 407, 92, 57/93, 100; 384/227, 228, 239, 144, 603

[56] References Cited

U.S. PATENT DOCUMENTS

| | | | |
|---|---|---|---|
| 3,958,846 | 5/1976 | Donner | 57/406 X |
| 3,972,172 | 8/1976 | Waleckx | 57/92 X |
| 4,022,008 | 5/1977 | Pimiskern et al. | 57/100 |
| 4,112,663 | 9/1978 | Chrtek et al. | 57/406 |
| 4,116,505 | 9/1978 | Stahlecken | 57/406 X |
| 4,261,165 | 4/1981 | Burgermeisten et al. | 57/406 |
| 4,513,566 | 4/1985 | Rajsigl et al. | 384/227 X |
| 4,633,664 | 1/1987 | Mueller-Storz et al. | 57/100 X |
| 4,773,210 | 9/1988 | Landwehrkamp et al. | 57/92 X |

Primary Examiner—John Petrakes
Attorney, Agent, or Firm—Notaro & Michalos

[57] ABSTRACT

A spindle is provided which is intended especially for use in the mounting arrangement of a spinning rotor within the spinning housing of a textile spinning machine. The spindle comprises an outer sleeve, two rows of balls disposed in cages, and a shaft whose external end portion is adapted to be driven by a drive arrangement for inducing rotary motion. The internal end portion of the shaft is disposed within the outer sleeve and forms a dynamically elastic portion of the shaft having a smaller diameter than that of the main spindle shaft. The spinning rotor is pressed on the dynamically elastic portion of the shaft. Between the rotor space, behind the spinning rotor and a compensation space, a rotary, or non-rotary, gasket is provided which includes a labyrinth knife.

10 Claims, 3 Drawing Sheets

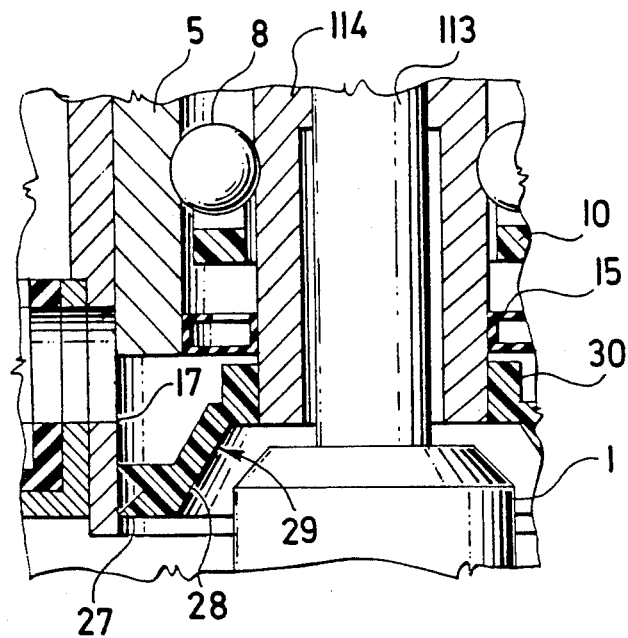
_fig_3
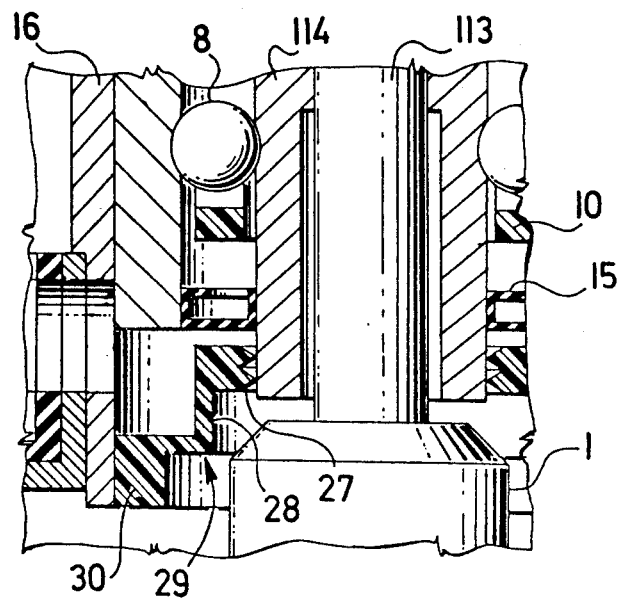
_fig_4

SPINDLE CONSTRUCTION FOR MOUNTING ARRANGEMENTS FOR SPINNING MACHINE ROTORS

FIELD OF THE INVENTION

The invention relates to a spindle and more especially to a spindle for the mounting arrangement of a spinning rotor within the spinning housing of a spinning machine.

BACKGROUND OF THE INVENTION

Considering prior art mounting arrangements for a spinning rotor, Czechoslovak Patent Specification No. 140 257 discloses an arrangement wherein the shaft, on which the spinning rotor is mounted, passes through a recess in a supporting sleeve and, at its end, is fixed in its conical fastening surface at the start of the supporting sleeve, or over the whole length of the recess there being disposed a resilient element. At the external side of the supporting sleeve at its ends, there are located ball bearings which are directly fixed within the recess of the spinning housing. Thus, the shaft is, in essence, constituted by a dynamically elastic portion, which, through its fastening surface, is fixed in the dynamically rigid portion constituted by the supporting sleeve. Relative to the fixation of the conical fastening surface within the bearing arrangement at the end of the supporting sleeve, the dynamically elastic portion is provided with a resilient element at the opposite end of the supporting sleeve. This design is rather complex and exacting not only from manufacturing point of view, but in operation, the resilient element will show, after a certain time, a decrease in elasticity thereby resulting in higher vibration amplitudes of the rotor. The forces from the vibrating shaft are transmitted directly into the bearings thereby causing considerable noise.

These have been the reasons for the development of a special mounting arrangement disclosed, for example, in Czechoslovak Patent Specification No. 181 015, wherein, on the one hand, the spindle comprises an outer sleeve with races for two ball rows arranged in cages, a shaft provided with races, whose external end portion is adapted for power transmission from the driving means and whose internal end portion is adapted for mounting arrangement of the spinning rotor, as well as a seal for sealing the annular gap, and, on the other hand, a resilient-mounted intermediate sleeve for fixing the outer sleeve provided with an internal wall and resilient damping elements with an outer supporting sleeve for mounting within the spinning housing. With this design, however, the shaft constitutes a dynamically rigid portion, through which forces from the vibrating rotor are directly transmitted into both ball rows. Further, this approach is also inadequate for high rotor speeds up to 90,000 revolutions per minute and higher, as it is not capable of damping the vibrations of the rotor. Although a relatively accurate balanced state of the rotor during its manufacture is achieved, in operation, an uneven deposition of dirt or other impurities upon the so-called collecting groove in the rotor takes place, thus disturbing the balanced state of the rotor and causing vibrations which promote rapid wear of the races and balls. At the same time, the noise produced greatly exceeds admissible limits. The operation speeds approach critical speeds of the third degree, and substantial dynamic forces act upon the race-ball complement or assembly thereby reducing the reliability and service-life of the whole spindle to an intolerable degree, and thus making the spindle unsuitable for use at the speeds mentioned.

With respect to sealing of the compensation space between the spinning rotor and the front wall of the outer sleeve, it is known, for example, from Czechoslovak Patent Specification No. 181 015, to provide a labyrinth seal constituted by a labyrinth knife or blade arranged directly on the spinning rotor hub. The labyrinth knife is oriented towards the wall of the spinning housing. With respect to the resilient mounting of the outer sleeve with the rigid shaft within the intermediate sleeve with resilient damping elements, the rotor, due to the imbalance thereof, is caused to vibrate thereby causing contact of the labyrinth knife with the wall of the spinning housing. Therefore, it has been necessary to select greater clearance values between the labyrinth knife and the spinning housing, which has resulted in a reduction in the efficiency of the seal and this again unfavorably affects pneumatic conditions within the rotor space of the spinning housing where for technological reasons concerning the fibre supply there is sub-atmospheric pressure generated through exhaustion of air from the spinning rotor.

In Czechoslovak Patent Specification No. 238 202, a labyrinth seal construction is disclosed wherein the labyrinth gap is created between the external labyrinth surface provided on the spinning rotor-hub and the internal wall of the cylindrical shaped orifice within the intermediate sleeve with resilient damping elements. Because the relatively rigid shaft guided in the outer sleeve will not allow higher vibration excitation relative to the intermediate sleeve, and because the rotor unbalance-related vibrations are dampened solely by damping elements arranged on the intermediate sleeve, the seal is sufficient for use over a certain speed range. However, the seal provides insufficient damping of the rotor vibrations causing, on the one hand, premature wear, and, on the other hand, excessive noise. These limitations manifest themselves especially at speeds of 90,000 revolutions per minute and above.

SUMMARY OF THE INVENTION

Important objects of the present invention include improving the reliability of a spindle construction of the general type described above for speeds at 90,000 revolutions per minute and higher, removing or reducing the unfavorable influence of vibrations so that critical speeds can be shifted beyond the range of the operating speeds and providing efficient sealing of the compensation space within the spinning housing.

The objects discussed above are achieved through the provision of a spindle comprising, an outer sleeve with races for two ball rows arranged in cages, a shaft provided with races and having an external end portion adapted to be driven by driving means and an internal end portion adapted for the mounting arrangement of the spinning rotor as well as a seal for sealing the annular gap, a plurality of balls arranged between the outer sleeve and the shaft, the shaft comprising a dynamically elastic portion and a supporting sleeve including an internal recess, said spindle further comprising an intermediate sleeve for fixing the outer sleeve and including an internal wall having a cylindrical orifice therein, a plurality of resilient damping elements with an outer supporting sleeve adapted for mounting within the spinning housing, a labyrinth seal disposed in the space between the spinning rotor and the front side of the outer sleeve, said labyrinth seal including a labyrinth knife separating the rotor space within the spinning housing from a compensation space between the labyrinth seal and the front side of the outer sleeve, interconnected through an air-aspiration orifice with a space external of the spinning housing, said shaft, including said dynamically elastic portion and said supporting sleeve including said internal recess, also comprising a fastening surface defining a cylindrical bore, and at least one said race for an inner row of said balls, said supporting sleeve constituting at least a part of a dynamically rigid portion of the shaft, the dynamically elastic portion of the shaft being limited by the length thereof between the beginning of the hub of the spinning rotor and a transition area between the internal recess of the supporting sleeve and fastening surface at which the dynamically rigid portion begins, and said transition area is provided in the first half of the length of the outer sleeve laterally adjacent to said inner ball row.

The advantage of this construction is in that dynamic forces arising from the unbalanced spinning rotor are eliminated which otherwise would adversely affect the first, i.e., the inner, ball row, and these forces are more equally distributed between both ball rows. Thus the reliability of the bearing, i.e., of the spindle, is enhanced, as unstable critical speeds are shifted beyond the operating speeds.

In accordance with one preferred embodiment of the invention the dynamically elastic portion of the shaft of a smaller diameter constitutes a unit with the dynamically rigid portion of greater diameter, said dynamically rigid portion being provided with a said race for an outer ball row and being terminated by said external end portion projecting from the external front side of the outer sleeve, the smaller diameter dynamically elastic portion, through the fastening surface, being received in the supporting sleeve with the race for the inner ball row and forming an internal recess in communication with said cylindrical bore defined by said fastening surface to create a gap relative to the dynamically elastic portion.

The main advantage of this embodiment is in simplifying production and facilitating assembly.

According to a further embodiment of the invention the dynamically elastic portion of the shaft of relatively smaller diameter constitutes a self-contained component passing through the internal recess and a portion thereof is received in said cylindrical bore and is secured to the fastening surface defining the cylindrical bore of the supporting sleeve, the supporting sleeve being provided with a pair of said races for two said ball rows and being terminated by the external end portion projecting from one side of the outer sleeve.

This embodiment enables accurate and independent manufacture of both parts relative to each other, as both parts are rotary components, both races for the balls being formed on one component.

In order to provide efficient sealing of the compensation space, the labyrinth knife of the invention is provided on a gasket wall provided with peripheral fastening flange and disposed between the shaft supporting sleeve and a cylindrical orifice in the internal wall of the intermediate sleeve. The peripheral fastening flange of the gasket is attached to the intermediate sleeve and the labyrinth knife is directed or oriented towards the wall of the shaft supporting sleeve, or, alternatively, the peripheral fastening flange of the gasket is attached to the shaft supporting sleeve and the labyrinth knife is oriented or directed towards the internal wall of the intermediate sleeve. The labyrinth knife is advantageously constituted by at least a pair of knife-like edges and preferably, at least the labyrinth knife is made of plastic, for example, of polyamide, polytetrafluorethylene, and the like.

The advantage of this sealing construction is that efficient sealing of the compensation space from the rotor space is achieved with minimum air aspiration into the rotor space, while allowing for fluctuation of the rotor on the dynamically elastic portion of the shaft without substantial alteration of the labyrinth gap. The gasket is easy to manufacture, especially of plastics exhibiting elastic properties such as polyamide, polytetrafluorethylene and similar materials as mentioned above. When molding such a gasket, it is easy, by using injection molding techniques, to produce two or more labyrinth knives which are, advantageously, created as elastic, thin-walled knife-like edges constituting an efficient seal.

Other features and advantages will be described in, or apparent from, the detailed description of preferred embodiments of the invention which follows.

BRIEF DESCRIPTION OF THE DRAWINGS

The invention will be discussed further below in connection with the exemplary construction shown in FIGS. 1 to 4 wherein:

FIG. 3 is a cross-sectional detail of a gasket with a labyrinth knife oriented towards the wall of the intermediate sleeve.

FIG. 4 is a corresponding cross-section wherein the labyrinth knife is oriented towards the wall of the supporting sleeve.

DESCRIPTION OF THE PREFERRED EMBODIMENTS

Figure 1:
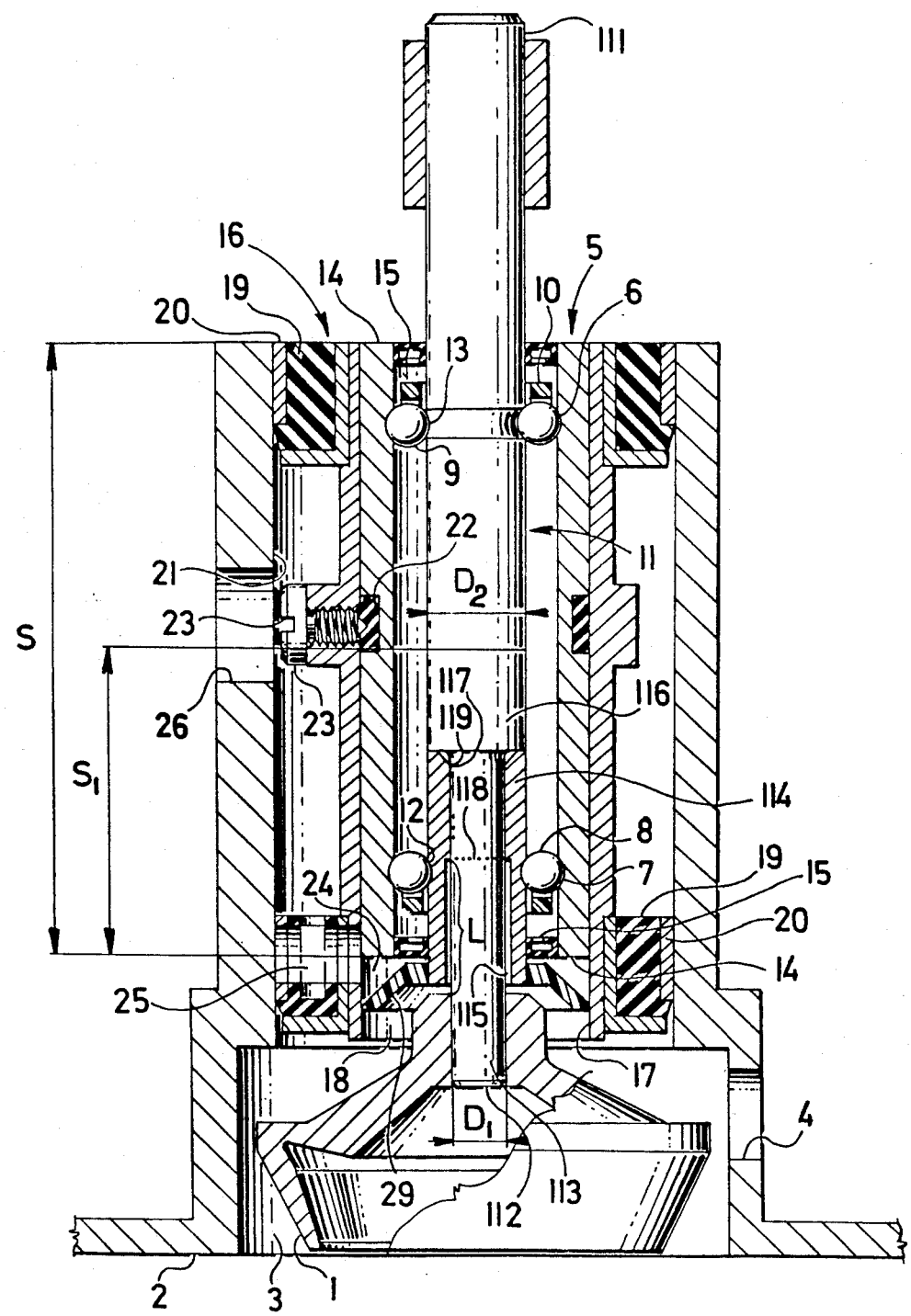
FIG. 1 is a cross-sectional view of the spindle of the invention, the self-contained shaft of which has two different diameters and the supporting sleeve is fixed to the smaller diameter portion, one ball race being disposed on the supporting sleeve, the other on the greater diameter portion of the shaft.

FIG. 1 shows a cross-sectional view of the spindle suited and designated especially for the mounting arrangement of a known spinning rotor 1 within a spinning housing 2, provided with a rotor space 3 connected through a delivery orifice 4 to exhaust mains (not shown). At the front side of the spinning rotor 1 and the spinning housing 2, there is located a combing body for fibre supply and yarn delivery. Such combing bodies are conventional and thus the combing body is not shown in detail.

Figure 2:
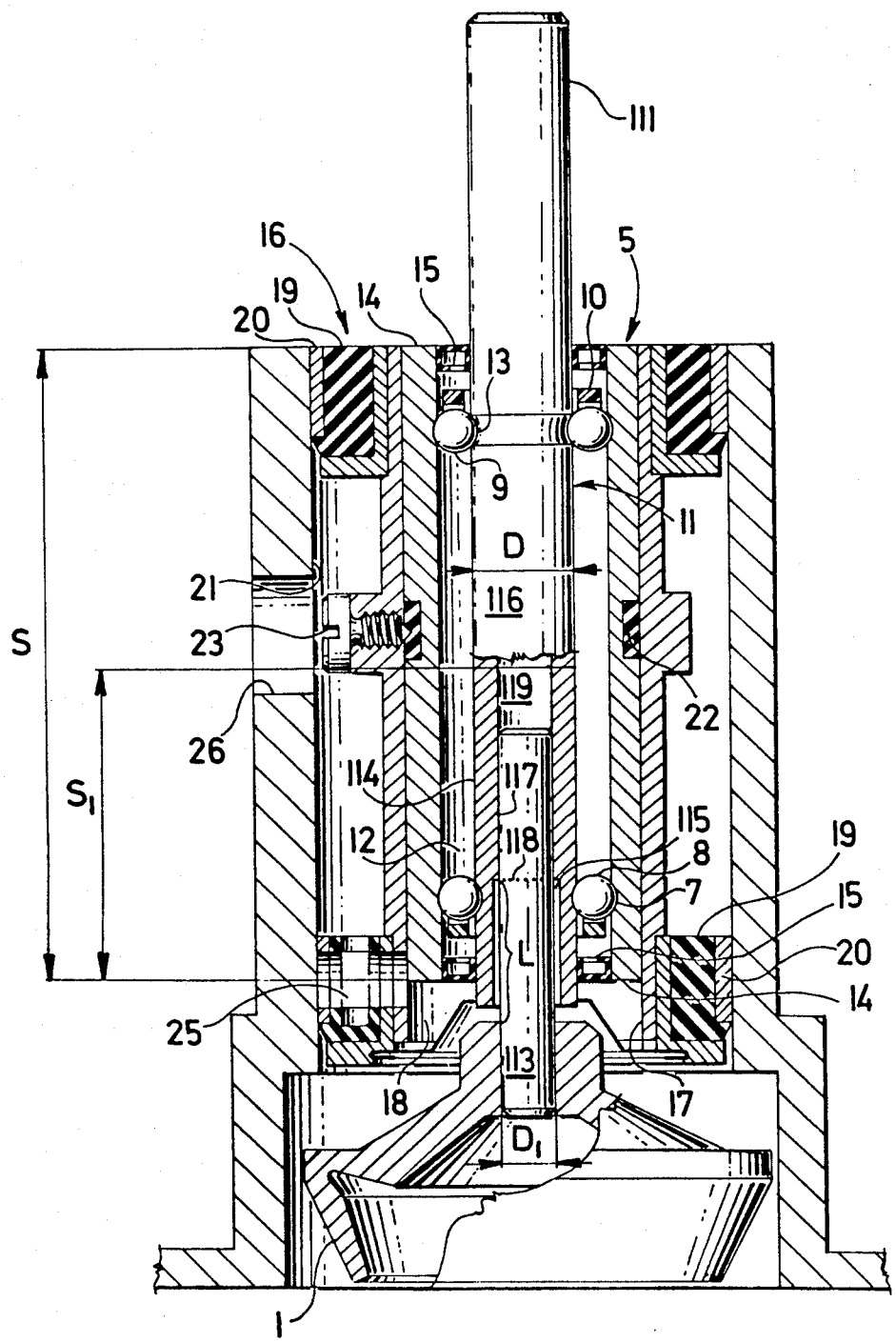
FIG. 2 shows a corresponding cross-section of a second embodiment, wherein the shaft is constituted by the supporting sleeve with both ball rows or their races and where the dynamically elastic portion is fixed within the sleeve bore.

The actual spindle consists of an outer sleeve 5 with races 6, 7 for ball rows 8, 9 arranged in cages 10, as well as a shaft 11 with further races 12, 13 for ball rows 8, 9 and with an external end portion 111 adapted for the transmission of power thereto from a driving means (not shown), and with internal end portion 112 adapted for mounting arrangement of the spinning rotor 1. The external end portion 111 of the shaft 11 may be provided, for example, with a pulley member, as illustrated in FIG. 2, which is adapted to engage an endless belt (not shown) constituting the driving means. The external end portion 111 of the shaft 11 may also constitute, for example, a rotor located within the stator of an electric motor.

To provide sealing of the annular gap in which balls 8, 9 are disposed, seals 15 are arranged between the outer sleeve 5 and the shaft 11, at both front sides 14 of the outer sleeve 5. The shaft 11 consists of a dynamically elastic portion 113 and a supporting sleeve 114 with an internal recess 115 and with at least one race 12 for the inner ball row 8. In the illustrated embodiment, the shaft 11 includes a dynamically rigid portion 116 provided with a second race 13 for the outer ball row 9. In this exemplary embodiment, the shaft 11 constitutes a unit, i.e., the shaft consists of the dynamically rigid portion 116 and of the dynamically elastic portion 113 having a smaller diameter $D_1$ (thereby allowing for elastic effects at speeds of the spinning rotor 1) than the diameter $D_2$ of the dynamically rigid portion 116 terminated by the external end portion 111 projecting from the external front side 14 of the outer sleeve 5.

The supporting sleeve 114 is secured with its associated fastening surface 117 having the cylindrical bore 119 on the smaller diameter $D_1$ of the dynamically elastic portion 113. The actual dynamically elastic portion 113 of the shaft 11 is however, limited by the length L between the start of the hub of the spinning rotor 1 and the transition area 118 of the internal recess 115 of the supporting sleeve 114 into the fastening surface 117. This transition area 118 could also be termed the area of fixation of the dynamically elastic portion 113 into the dynamically rigid portion 116 of the shaft 11, because the rigid connection of the supporting sleeve 114 within the fastening surface 117 already constitutes the dynamically rigid portion 116.

The location of the transition area 118 of the dynamically elastic portion 113 into the dynamically rigid portion 116 is of importance, as the elastic swing of the dynamically elastic portion 113 is limited relative to the seal of the spinning rotor 1 on the face of the opposite combing body. This transition area 118 is located in the first half $S_1$ of the length S of the outer sleeve 5, namely at the side of, i.e., laterally adjacent to, the inner ball row 8. Thus a sufficient springing effect of the dynamically elastic portion 113 of the shaft 11 relative to the unbalance of the spinning rotor 1 together with a sufficient rigidity of the whole shaft 11, i.e., of its dynamically rigid portion 116, are achieved. As the internal recess 115 within the supporting sleeve 114 passes from its face as far as the transition area 118 of the dynamically elastic portion 113 into the dynamically rigid portion 116 of the shaft 11 and, accordingly, also under the wall of the supporting sleeve 114 at the location of the race 12 for the inner ball row 8, improved transmission of the force of the vibrating spinning rotor 1 to both ball tows 8, 9 is provided, thereby contributing to noise and wear reduction. At the location of the internal recess 115 in the supporting sleeve 114 there is provided, relative to the dynamically elastic portion 113, an annular gap. From practical point of view it is of advantage if the diameter $D_1$ of the dynamically elastic portion 113 is within 4 to 6 mm at its minimum length L ranging from 20 to 25 mm, and at its maximum length L ranging from 40 to 60 mm.

With respect to the connection of the dynamically elastic portion 113 to the dynamically rigid portion 116, the shaft 11 can take other forms. According to the exemplary embodiment shown in FIG. 2, for example, the dynamically elastic portion 113 with smaller diameter $D_1$ constitutes a self-contained component passing through the internal recess 115 and through its part is fixed within the fastening surface 117 of the cylindrical bore 119 of the supporting sleeve 114, the supporting sleeve 114 being provided with a pari of races 12, 13 for two ball rows 8, 9 and being terminated by the external end portion 111 projecting from the external front side 14 of the outer sleeve 5.

In both embodiments, the shaft also incorporates the intermediate sleeve 16 serving to provide elastic support and fixation of said outer sleeve 5. The intermediate sleeve 16 is provided with an internal wall 17 having a cylindrical orifice 18 and resilient damping elements 19 made, for example, of rubber, which are provided with outer supporting sleeves 20. The outer supporting sleeves 20 may also be connected into a compact unit and serve to support the spindle within the cylindrical recess 21 of the spinning housing 2. The outer sleeve 5 is fixed within the cylindrical orifice 18 of the internal wall 17 of the intermediate sleeve 16 by means of a known resilient fastening ring 22 located in an external groove on the outer sleeve 5 and by means of a bolt 23 guided in the internal wall 17 of the intermediate sleeve 16. In the space between the spinning rotor 1 and the front side 14 of the outer sleeve 5 there is located, as is conventional, a labyrinth seal separating the rotor space 3 within the spinning housing 2 from the compensation space 24 between said labyrinth seal and the front side 14 of the outer sleeve 5. The compensation space 24 is interconnected through a conventional air-aspiration orifice 25 with the external space of the spinning housing 2 through an assembly orifice 26 provided in the spinning housing 2 for the bolt 23.

The labyrinth seal is created by a labyrinth knife or blade 27 located on the wall 28 of a gasket 29 provided with a peripheral fastening flange 30 as illustrated in the detail shown in FIGS. 3 and 4. The wall 28 is deflected with benefit from the peripheral fastening flange 30, to enable a potential spring-back of the labyrinth knife 27 in case of a greater swing of the spinning rotor 1, resulting from wear of balls 8, 9 and races 6, 7, i.e., labyrinth knife or blade 27 is able to accommodate changes due to wear and still provide effective sealing.

The labyrinth knife 27 formed on the gasket 29 may be created in the form of a narrow wall with an insert, as shown in FIG. 1, or in the form of a knife-like modified edge, which may be one or, with benefit, at least two, as shown in FIG. 3, or three as in FIG. 4.

The labyrinth knife 27 of the gasket 29 is according to one embodiment (FIG. 3) oriented towards the internal wall 17 of the intermediate sleeve 16, whereas the peripheral fastening flange 30 is attached to the supporting sleeve 114 of the shaft 11 projecting in front of the front side 14 of the outer sleeve 5.

According to the second beneficial embodiment (FIG. 4), the peripheral fastening flange 30 of the gasket 29 is fixed to the intermediate sleeve 16, and the labyrinth knife 27 is oriented towards the wall of the supporting sleeve 114 of the shaft 11.

Potential vibrations of the spinning rotor 1, resulting from passing through critical speeds thus have no influence upon the labyrinth gap, as these vibrations are compensated partly by the dynamically elastic portion 113 of the shaft 11, and partly by the resilient damping elements 19. It is of advantage if at least the labyrinth knife 27, and/or the wall 28, or the whole gasket 29 is made of plastic, for example of polyamide, polytetrafluorethylene or of an analogous elastic and friction-resistant material.

Although the present invention has been described relative to exemplary embodiments thereof, it will be understood by those skilled in the art that variations and modifications can be effected in these exemplary embodiments without departing from the scope and spirit of the invention.

We claim:

1. A spindle, particularly for a mounting arrangement of spinning rotor within the spinning housing of a spinning machine, said spindle comprising an outer sleeve with races for two ball rows arranged in cages, a shaft provided with races and having an external end portion adapted to be driven by driving means and an internal end portion adapted for the mounting arrangement of the spinning rotor as well as a seal for sealing the annular gap, a plurality of balls arranged between the outer sleeve and the shaft, the shaft comprising a dynamically elastic portion and a supporting sleeve including an internal recess, said spindle further comprising an intermediate sleeve for fixing the outer sleeve and including an internal wall having a cylindrical orifice therein, a plurality of resilient damping elements with an outer supporting sleeve adapted for mounting within the spinning housing, a labyrinth seal disposed in the space between the spinning rotor and the front side of the outer sleeve, said labyrinth seal including a labyrinth knife separating the rotor space within the spinning housing from a compensation space between the labyrinth seal and the front side of the outer sleeve, interconnected through an air-aspiration orifice with a space external of the spinning housing, said shaft, including said dynamically elastic portion and said supporting sleeve including said internal recess, also comprising a fastening surface defining a cylindrical bore, and at least one said race for an inner row of said balls, said supporting sleeve constituting at least a part of a dynamically rigid portion of the shaft, the dynamically elastic portion of the shaft being limited by the length thereof between the beginning of the hub of the spinning rotor and a transition area between the internal recess of the supporting sleeve and fastening surface at which the dynamically rigid portion begins, and said transition area is provided in the first half of the length of the outer sleeve laterally adjacent to said inner ball row.

2. A spindle as claimed in claim 1, wherein the dynamically elastic portion of the shaft of a smaller diameter constitutes a unit with the dynamically rigid portion of greater diameter, said dynamically rigid portion being provided with a said race for an outer ball row and being terminated by said external end portion projecting from the external front side of the outer sleeve, the smaller diameter dynamically elastic portion, through the fastening surface, being received in the supporting sleeve with the race for the inner ball row and forming an internal recess in communication with said cylindrical bore defined by said fastening surface to create a gap relative to the dynamically elastic portion.

3. A spindle as claimed in claim 1, wherein the dynamically elastic portion of the shaft of relatively smaller diameter constitutes a self-contained component passing through the internal recess and a portion thereof is received in said cylindrical bore and is secured to the fastening surface defining the cylindrical bore of the supporting sleeve, the supporting sleeve being provided with a pari of said races for two said ball rows and being terminated by the external end portion projecting from one side of the outer sleeve.

4. A spindle as claimed in claim 1, wherein the labyrinth knife is provided on a wall of a gasket that includes a peripheral fastening flange and is disposed between the supporting sleeve of the shaft and a cylindrical orifice in an internal wall of the intermediate sleeve.

5. A spindle as claimed in claim 4, wherein the peripheral fastening flange of the gasket is attached to the intermediate sleeve and the labyrinth knife is directed towards the wall of the supporting sleeve of the shaft.

6. A spindle as claimed in claim 5, wherein the labyrinth knife comprises at least one pair of knife-like edges.

7. A spindle as claimed in claim 4, wherein the peripheral fastening flange of the gasket is attached to the supporting sleeve of the shaft and the labyrinth knife is directed towards the internal wall of the intermediate sleeve.

8. A spindle as claimed in claim 7, wherein the labyrinth knife comprises at least one pair of knife-like edges.

9. A spindle as claimed in claim 4, wherein at least the labyrinth knife is made of plastic.

10. A spindle as claimed in claim 9 wherein said plastic comprises an elastic, friction-free plastic selected from the group comprising polyamide and polytetrafluorethylene.

* * * * *